US008308248B2

(12) United States Patent
Jäger et al.

(10) Patent No.: US 8,308,248 B2
(45) Date of Patent: Nov. 13, 2012

(54) METHOD FOR OPERATING A VEHICLE BRAKE SYSTEM AND VEHICLE BRAKE SYSTEM

(75) Inventors: Markus Jäger, Eschborn (DE); Henning Kerber, Schwalbach am Taunus (DE); Roger-Lutz Müller, Mainz-Kastel (DE)

(73) Assignee: Continental Teves AG & Co. oHG (DE)

( * ) Notice: Subject to any disclaimer, the term of this patent is extended or adjusted under 35 U.S.C. 154(b) by 584 days.

(21) Appl. No.: 12/594,288

(22) PCT Filed: Apr. 3, 2008

(86) PCT No.: PCT/EP2008/054034
§ 371 (c)(1),
(2), (4) Date: Oct. 1, 2009

(87) PCT Pub. No.: WO2008/122572
PCT Pub. Date: Oct. 16, 2008

(65) Prior Publication Data
US 2010/0113215 A1    May 6, 2010

(30) Foreign Application Priority Data

Apr. 5, 2007 (DE) .......................... 10 2007 016 424
Apr. 3, 2008 (DE) .......................... 10 2008 017 480

(51) Int. Cl.
*B60T 8/64* (2006.01)
(52) U.S. Cl. ....................................................... 303/152
(58) Field of Classification Search .............. 303/3, 152; 701/22, 70–72
See application file for complete search history.

(56) References Cited

U.S. PATENT DOCUMENTS

| | | | |
|---|---|---|---|
| 5,476,310 A * | 12/1995 | Ohtsu et al. ....................... 303/3 |
| 5,511,859 A | 4/1996 | Kade et al. |
| 6,457,784 B1 | 10/2002 | Bohme et al. |
| 7,651,177 B2 * | 1/2010 | Jeon et al. ...................... 303/151 |
| 7,654,620 B2 * | 2/2010 | Jeon et al. ...................... 303/152 |
| 2003/0062770 A1 | 4/2003 | Sasaki et al. |
| 2003/0074125 A1 | 4/2003 | Walenty et al. |
| 2004/0046448 A1 | 3/2004 | Brown |
| 2005/0017574 A1 | 1/2005 | Weiberle et al. |
| 2007/0038340 A1 * | 2/2007 | Sekiguchi et al. .............. 701/22 |

FOREIGN PATENT DOCUMENTS

| | | |
|---|---|---|
| DE | 198 10 656 A1 | 9/1999 |
| DE | 103 19 663 A1 | 11/2004 |
| DE | 103 32 207 A1 | 2/2005 |
| WO | WO 2005/110827 | 11/2005 |

* cited by examiner

*Primary Examiner* — Christopher Schwartz
(74) *Attorney, Agent, or Firm* — RatnerPrestia

(57) ABSTRACT

A method for operating a vehicle brake system and a corresponding vehicle brake system, particularly for motor vehicles. The vehicle wheels of the motor vehicle associated with an axle are at least partially driven by 'WV' an electric motor that can be operated as a generator during regeneration of braking energy, thus exerting a braking regeneration el torque on the respective axle. To prevent overbraking on the rear axle, the regeneration torque acting on at least one rear axle (HA) is limited such that the slippage present on the at least one vehicle wheel of the rear axle (HA) does not exceed or only negligibly exceeds a first slippage threshold individually associated with the respective vehicle wheel.

10 Claims, 3 Drawing Sheets

Key:
- ← Regenerative braking
- ← Conventional braking
- ⇐ Longitudinal-force potential (adhesion limit)

METHOD FOR OPERATING A VEHICLE BRAKE SYSTEM AND VEHICLE BRAKE SYSTEM

CROSS REFERENCE TO RELATED APPLICATION

This application is the U.S. national phase application of PCT International Application No. PCT/EP2008/054034, filed Apr. 3, 2008, which claims priority to German Patent Application No. DE102007016424.8, filed Apr. 5, 2007 and German Patent Application No. DE102008017480.7, filed Apr. 3, 2008, the contents of such applications being incorporated by reference herein.

FIELD OF THE INVENTION

The present invention relates to a method for operating a vehicle brake system and to a vehicle brake system, in particular for motor vehicles having at least one front axle and at least one rear axle, wherein each axle is assigned at least two vehicle wheels, wherein at least one wheel brake, which generates a braking torque and can preferably be activated hydraulically, is provided on the at least one front axle and/or the at least one rear axle, wherein the vehicle wheels which are assigned to an axle are at least partially driven by an electric motor which can be operated as a generator during regeneration of braking energy and in the process exerts a braking regeneration torque on the respective axle.

BACKGROUND OF THE INVENTION

In motor vehicles, wheel brakes which can be activated hydraulically or electromechanically are provided for operating a vehicle brake system. As a rule, the wheel brakes which can be activated hydraulically are arranged on at least one of the front axles, and if appropriate, wheel brakes which can be activated electromechanically are arranged on at least one of the rear axles of the motor vehicle.

In vehicles with a hybrid drive, the drive can be provided either by means of an internal combustion engine or by means of an electric motor; in an electric vehicle the drive is provided exclusively by means of the electric motor. The electric motor is connected for this purpose to one or more axles of the motor vehicle and drives said axle or axles. In the operating state of what is referred to as the regenerative mode (also referred to as regenerative brakes, regeneration=recovery), the electric motor can be operated as a generator, for example during deceleration maneuvers or when traveling on downward gradients which require a negative drive torque, and the electric motor can therefore generate electrical energy without using fuel and in the process simultaneously spare the brakes. As a result, the overall consumption of energy of the motor vehicle can be reduced, the efficiency can be increased, the wear on the brakes minimized and the operation of the motor vehicle therefore made more economic. The potential of recovering braking energy is determined from the ratio of the regeneration torque to the overall braking torque and is also dependent on the possibility of distributing the regeneration torque between the front and rear axles.

As a rule, motor vehicles having a brake system which is configured for regenerative braking have for this purpose various types of brakes which are also referred to as brake actuators.

As a rule, in hybrid vehicles a pair of hydraulic friction brakes are used as conventional brakes for braking the front axle wheels and/or for the rear axle wheels, such as are known from conventional motor vehicles. Alternatively or additionally, a pair of friction brakes which can be activated electromechanically can preferably be used for braking the rear axle wheels. Usually at least some of the total amount of braking force which is necessary or desired by the driver is provided by the generator or the electric motor which is in the generator mode. The electrical energy which is acquired in the process is fed into or fed back into a storage medium such as, for example, an on-board battery and is used again for driving the motor vehicle by means of a suitable drive.

During the braking of a vehicle which has an electric motor whose generator mode is used to recover braking energy, a further braking torque, referred to as the regeneration torque, which is provided by the electric motor, is generated in addition to the braking torque of the conventional wheel brakes which can be activated hydraulically and electromechanically. This braking torque of the electric motor arises from the known generator effect in electric motors which act as a dynamo or a generator in mechanical drives without a supply of electric current, and generate electric current. In the process, an opposing force which counteracts the mechanical drive is produced and in the present case said force acts as a braking torque. The total braking force of the motor vehicle is therefore composed of the braking force of the wheel brakes which can be activated hydraulically, the braking force of the wheel brakes which can be activated electromechanically and the braking force of the electric motor which acts as a generator (regeneration torque, regenerative braking torque).

DE 103 19 663 A1 discloses a method for setting the pedal characteristic curve of a hybrid brake system with variable distribution of the braking force. In the previously known method for operating a brake system, which method comprises a hydraulic service brake system and an electric service brake system with wheel brakes to which brake pressure is applied when a brake pedal is activated, a control device controls a brake pressure modulator of the hydraulic service brake system and the electric service brake system in such a way that when there is a change in the distribution of the braking force between the hydraulic service brake system and the electric service brake system, the ratio of pedal force and/or pedal travel to the total braking torque of the vehicle remains essentially constant. An electric motor which can be operated as a generator is not provided.

In vehicles having a hybrid drive or an (exclusively) electric drive, the electric generator on one or more of the axles of the vehicle becomes active as soon as the driver takes his foot off the accelerator pedal or brakes. As a result, the regeneration torque which is generated by the regeneration and which leads to a reduction in the adhesion at the vehicle wheels takes effect, extending as far as loss of the adhesion. If this additional regeneration torque occurs in a boosted fashion at the rear axle, the rear axle is referred to as being overbraked. Overbraking causes the motor vehicle to lose its driving stability, with the result that the vehicle veers off or skids.

It can become critical in terms of vehicle movement dynamics if the distribution of the braking force shifts in the direction of the rear axle. In vehicles in which the generator acts exclusively/mainly on the rear axle, hard braking of the rear axle in order to achieve the highest possible recovery of energy involves the risk of overbraking of the rear axle. For this reason, an electronic vehicle movement dynamics control system for restoring possible instability caused by the driving concept is virtually indispensable.

Conventional strategies for controlling the generator torque permit unrestricted regeneration until the electronic braking-force distribution control system (EBD) engages owing to wheel instability or vehicle instability. In this case, the regeneration is frequently aborted and subsequently conventional braking is continued. A disadvantage of this strategy is that the critical situation which forces the EBD system to engage is caused by the regeneration strategy itself. As a result, the number of pump activities and valve activities increases significantly, which has to be taken into account in the configuration of the hydraulic system.

SUMMARY OF THE INVENTION

An object of the invention is accordingly to specify an improved method for operating a vehicle brake system and/or to provide an improved vehicle brake system, so that overbraking on one of the rear axles of the motor vehicle is prevented and unnecessary pump activities and valve activities are avoided.

The object defined above is achieved by a method and a vehicle brake system in which the regeneration torque acting on the at least one rear axle is limited in such a way that the slip present at at least one vehicle wheel of this rear axle does not exceed, or exceeds only to an insignificant degree, a first slip threshold which is respectively individually assigned to this vehicle wheel.

In the case of braking processes, apart from other variables the slip present at the respective tire is of great importance. Tire slip (usually given as a percentage) refers to the ratio of a driven tire to a wheel which is being entrained in an idle fashion, wherein the slip in the case of braking is between 0% (wheel entrained in an idle fashion and driven tires rotate at the same speed) and 100% (locking of the tires). In the case of a slip value which is usually below 20%, the coefficient of friction/slip curve has a maximum value at which the transmission of force of the tire onto the underlying surface is at an optimum. Furthermore, by means of a slip control system the slip is controlled in such a way that it is below this maximum value since a sudden decline in adhesion occurs above the maximum value.

As a result of the sensitive monitoring of slip according to aspects of the invention, on the one hand the maximum utilization of adhesion is achieved and, on the other hand, a sudden decline in adhesion is prevented. In this context, the regenerative braking torque portion is reduced owing to the slip detection even before the EBD system engages, with the result that the frequency of the EBD system deployment is reduced.

In a preferred exemplary embodiment there is provision that the first slip threshold which is individually assigned to a vehicle wheel is variable. Said slip threshold is adapted to the changed vehicle conditions and environmental conditions, for example the quality of the underlying surface or the tire material. In addition, the first slip threshold can be different for each of the wheels which are arranged on an axle.

A particularly high degree of operational reliability and a further reduction in the pump activity and valve activity is achieved by virtue of the fact that the limitation of the regeneration torque is carried out by taking into account the slip of the vehicle wheel of the at least one rear axle which has the greater slip.

In a further exemplary embodiment, in addition, the regeneration torque acting on the at least one rear axle is increased if the slip present at at least one vehicle wheel of this rear axle drops below a second slip threshold which is individually assigned to this vehicle wheel. This maximum utilization of the adhesion potential permits the effectiveness of the regeneration to be increased and therefore allows fuel to be saved. In this context, a particularly high level of operational reliability and a further reduction in the pump activity and valve activity are also achieved by virtue of the fact that the change in the regeneration torque takes place when the slip drops below the second slip threshold of the vehicle wheel of the at least one rear axle which has the greater slip.

The vehicle can be operated in a way which is particularly effective and therefore economical in terms of fuel if the regeneration torque is limited by virtue of the fact that the distribution of the total braking force between the conventional brake and the regenerative brake is changed. With such a method it is possible, for example when the first slip threshold on the rear axle is exceeded, to distribute some of the regeneration torque to the front axle. As a result, the same amount of energy as before is acquired by means of regeneration but the instability which is present at the rear axle can be eliminated. Such distribution of the regeneration torque is possible if the drive train permits variable distribution of this torque or a plurality of generators which act on different axles are used. On the other hand, the portion of the conventional braking force in the overall braking force can be increased, in which case the increased portion acts, in particular, on one of the front axles.

In a further exemplary embodiment, the magnitude of the change in the regeneration torque depends on the distance of the determined slip from the first slip threshold or from the second slip threshold. Such a method permits rapid application of the regeneration torque and/or of the slip.

In addition, the vehicle acceleration and the wheel acceleration which is filtered over time are preferably used for the calculation of the slip since instability which is becoming apparent can already be detected at an early time by means of the comparison of the wheel acceleration with the vehicle acceleration (or vehicle deceleration), said comparison yielding the increase in slip. The detection can take place earlier than if the system waits until the slip which is calculated only from the wheel speed exceeds the slip threshold. In this context, the use of a wheel acceleration which is filtered over time is therefore advantageous because the unfiltered wheel acceleration from the derivation of the wheel speed is usually subject to severe interference. An PT1 filter can be used as the filter.

Further features, advantages and possible applications of the present invention emerge from the following description of an exemplary embodiment of the method according to aspects of the invention with reference to figures. All the described and/or illustratively represented features form, alone or in any desired combination, the subject matter of the present invention, also independently of their combination in the claims or their references.

BRIEF DESCRIPTION OF THE DRAWINGS

In the drawings, in each case in schematic form.

DETAILED DESCRIPTION OF THE PREFERRED EMBODIMENTS

Figure 1:
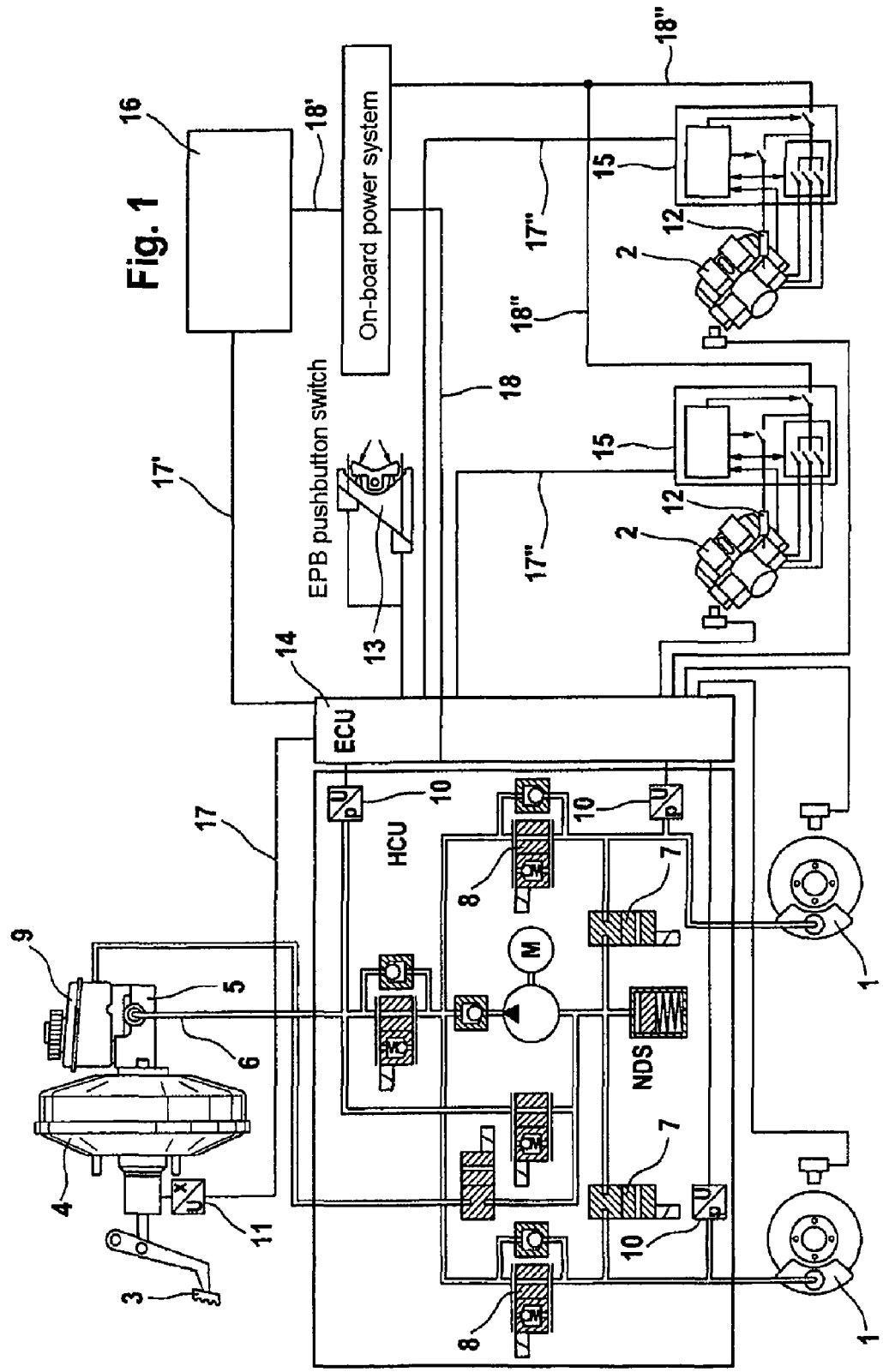
FIG. 1 shows a circuit diagram of a combined vehicle brake system with wheel brakes, which can be activated hydraulically, on the front axle, wheel brakes, which can be activated electromechanically, on the rear axle, and an electric motor for regenerative braking, FIGS. 2a, 2b each show a diagram in which the regenerative braking-force distribution between the front axle and the rear axle is formed by 0.2 g regenerative deceleration for a rear-wheel-drive vehicle (FIG. 2a) and an all-wheel-drive vehicle (FIG. 2b) with a distribution of 45/55.

A circuit diagram of the vehicle brake system by means of which the method according to aspects of the invention can be carried out is illustrated in FIG. 1. The vehicle brake system has wheel brakes 1 which can be activated hydraulically and wheel brakes 2 which can be activated electromechanically.

The wheel brakes 1 which can be activated hydraulically are arranged on a first axle of the motor vehicle, the front axle, and hydraulic pressure medium is applied to them using a pedal-activated vacuum braking-force booster 4 with downstream master cylinder 5. For this purpose, the wheel brakes 1 which can be activated hydraulically are connected to the master cylinder 5 with intermediate connection of inlet valves 8 via a hydraulic line 6. During a pressure reduction, the applied pressure medium is discharged into a pressureless pressure medium reservoir vessel 9 via outlet valves 7. In order to determine the applied hydraulic pressure and to carry out control processes, such as for example anti-lock brake control processes, a plurality of pressure sensors 10 are provided whose output signals are fed to a central open-loop and closed-loop control unit 14.

As is also apparent from FIG. 1, wheel brakes 2 which can be activated electromechanically and which can be activated in accordance with the hydraulic pressure applied to the wheel brakes 1 which can be activated hydraulically are arranged on a second axle, the rear axle of the motor vehicle. As already mentioned, the pressure which is applied to the wheel brakes 1 which can be activated hydraulically is determined using the pressure sensors 10. On the basis of this pressure value, the wheel brakes 2 which can be activated electromechanically on the rear axle are actuated, i.e. a brake application force of the wheel brakes 2 which can be activated electromechanically is set by taking into account a braking-force distribution function between the front axle and rear axle. Furthermore, the wheel brakes 2 which can be activated electromechanically can be actuated in accordance with the activation travel of the brake pedal 3, that is to say in accordance with the request of the vehicle driver. For this purpose, the activation travel of the brake pedal 3 is determined using a pedal travel sensor 11. The actuation of the wheel brakes 2 which can be activated electromechanically is performed in a decentralized fashion by means of two electronic control units 15 which are each assigned to a wheel brake 2 which can be activated electromechanically. The supply with electrical energy is carried out by means of a supply line 18" which connects the wheel brakes 2 which can be activated electromechanically to the on-board power system.

As is indicated only schematically in FIG. 1, the wheel brakes 2 which can be activated electromechanically have a parking brake device 12 with which the wheel brakes can be locked in the applied state in order to carry out a parking braking operation. The parking brake device 12 can be actuated using an operator control element 13, the abbreviation EPB indicating the wheel brake which can be activated electromechanically. The operator control element 13 is embodied as a pushbutton switch and has three switched positions for the commands "apply", "neutral" and "release", with only the central neutral position constituting a stable switched position.

The driver's braking request is, as already mentioned, sensed by the pedal travel sensor 11 and fed to the electronic open-loop and closed-loop control unit 14 via a signal line 17.

The signals of the operator control element 13 of the parking brake are also fed to the open-loop and closed-loop control unit 14. The two decentralized electronic control units 15 of the wheel brakes 2 which can be activated electromechanically are also connected to the open-loop and closed-loop control unit 14 via a signal line 17".

An electric motor 16 which, on the one hand, acts as the sole drive in an electric car or as an additional drive in a vehicle with an internal combustion engine and, on the other hand, is used to recover braking energy in the generator mode is connected to the open-loop and closed-loop control unit 14 via a further signal line 17'. In the case of driving, the electric motor 16 draws its supply voltage from the on-board power system via a supply line 18', and in the generator mode said electric motor feeds electrical energy back into the on-board power system via the same supply line 18'. In the generator mode just mentioned, the electric motor 16 acts as a dynamo and generates electric current. In this context, an opposing force, which acts as a further braking torque (regeneration torque) arises. The electric motor 16 which is operated as a generator acts here as a brake on the axles to which it is connected via the drive train (if appropriate a separate drive train for the electric motor 16). In the present example, the generator acts on the rear axle RA. The entire braking force of the motor vehicle is composed here of the braking force of the wheel brakes 1 which can be activated hydraulically, the braking force of the wheel brakes 2 which can be activated electromechanically and the braking force of the electric motor 16 which acts as a generator. These three braking forces have to be adapted in a suitable way, which is made possible by a suitable braking-force distribution.

With reference to the braking request sensed by the pedal travel sensor 11, the open-loop and closed-loop control unit 14 then determines the distribution of the total braking force which is desired or necessary on the basis of the request of a safety system, among the wheel brakes 2 which can be activated electromechanically, the wheel brakes 1 which can be activated hydraulically and the electric motor 16 which is operated in the regenerative mode. In this context, the regeneration torque present at the rear axle is limited in such a way that the slip present at at least one vehicle wheel of this rear axle does not exceed a slip threshold which is respectively individually assigned to this vehicle wheel.

Figure 2A:
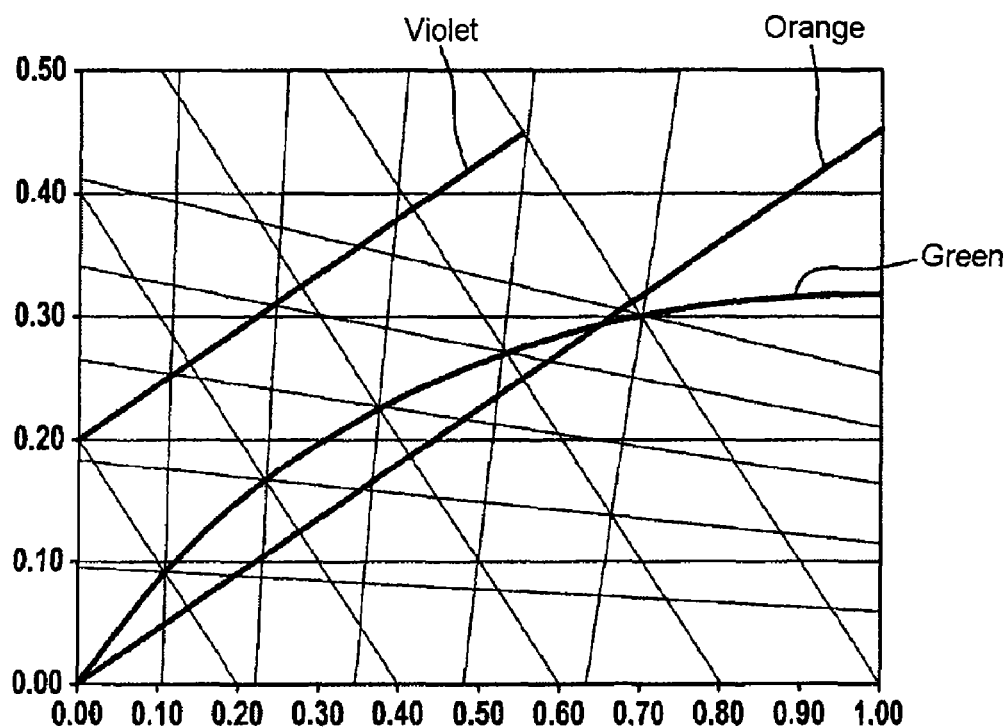
Figure 2B:
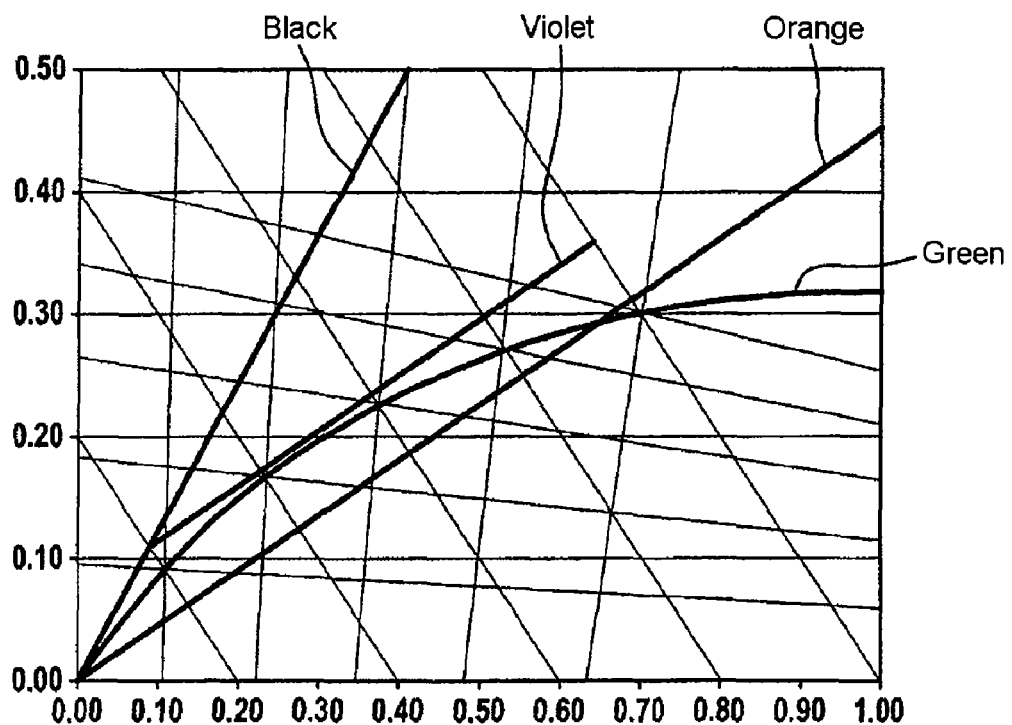

In the case of the braking-force distributions shown in FIGS. 2a and 2b, the braking force at the rear axle—also referred to for short as RA—is always plotted on the ordinate, and the braking force at the front axle—also referred to as FA for short—is always plotted on the abscissa. The plotted braking-force distributions relate to a hydraulic brake system which acts in the same way on all the wheels. The same hydraulic pressure is therefore present at all the wheels. In addition, in the case of the distribution in FIG. 2a, the regenerative braking torque acts only on the rear axle RA via the drive train. In the case of the distribution illustrated in FIG. 2b, the regenerative braking torque acts on all the axles.

FIG. 2a shows a shift in the braking-force distribution as a result of a 0.2 g regenerative deceleration for a rear-wheel-drive vehicle, in which case the regenerative braking torque acts only on the rear axle RA. In FIG. 2b, the same shift is plotted for an all-wheel-drive vehicle with distribution (45/55). Here, the lines of the colors orange: signifies the installed hydraulic braking-force distribution which results from the fact that the same hydraulic pressure is present at all the wheels, green: signifies the optimum braking-force distribution, black: signifies the braking-force distribution of the regenerative brake (in the case of braking), and violet: signifies the effective braking-force distribution in the case of 0.2 g purely regenerative braking and additional conventional braking in the case of severe deceleration.

The control strategy described below pursues the objective of setting the regeneration portion during braking in such a way that the driving safety continues to be ensured and nevertheless as much energy as possible can be recovered. The regeneration portion is limited here in such a way that a critical slip which destabilizes the vehicle does not occur at the rear axle. As a result of the emphasis on the sensitive control of the regenerative braking torque which is to be transmitted by the rear axle is it possible to significantly reduce the number of interventions by the vehicle movement dynamics controller and therefore the frequency of the pump switching operations and valve switching operations compared to the conventional strategy.

As is apparent from FIGS. 2a and 2b, the effective braking-force distribution changes as a result of redistribution of the total braking force between the conventional brake and the regenerative brake. In this context, in principle any point between the orange line and the violet line can be reached by a combination of regenerative braking and conventional braking without valves of the EBD system having to be switched. In the case of the regenerative brake, it is to be noted that the possible braking force is restricted by the power of the generator and therefore additional braking force has to be applied by means of the conventional brake starting from a certain limiting deceleration (here 0.2 g) which is frequently dependent on the speed.

The violet line represents the limiting line at which the regeneration potential is exhausted to an optimum degree and which is to be aimed at for a maximum energy gain. At the same time, this line represents the case which is the most unfavorable in terms of the driving stability since here the maximum utilization of the adhesion is required at the rear axle and overbraking of the rear axle compared to the front axle occurs.

By means of sensitive monitoring of slip at the rear axle it is possible to detect whether the adhesion limit at the rear axle has already been virtually reached or is exceeded. If this unstable state is detected, the situation can be stabilized by reducing the regenerative braking torque and increasing the braking torque of the conventional brake to the same degree. Since, in the present case, the reduction in the regeneration torque acts on the rear axle, but the increase in the conventional braking torque acts primarily on the front axle, owing to the braking-force distribution which has been installed, the braking-force distribution is, overall, changed in such a way that the adhesion stress on the rear axle is reduced.

Figure 3:
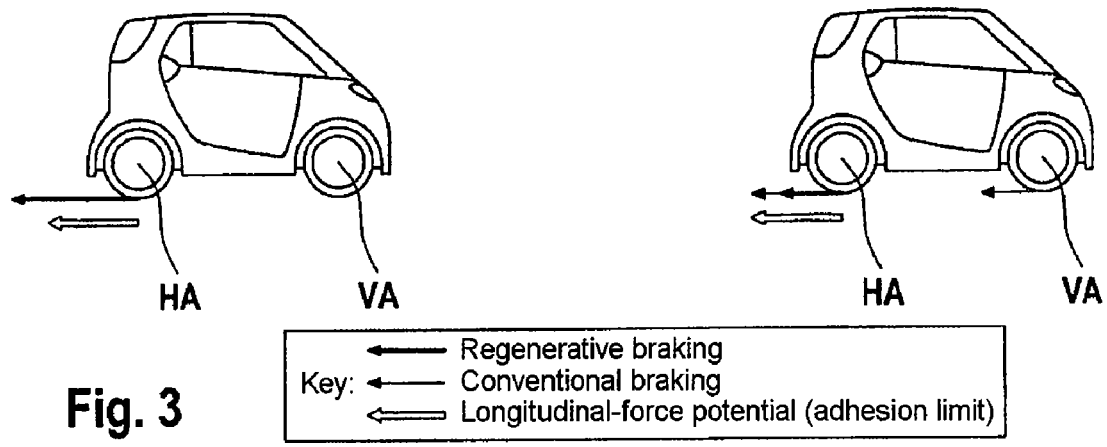
FIG. 3 shows the shifting of the braking-force distribution through redistribution of the portions of the regenerative brake and of the conventional brake by means of two pictograms.

FIG. 3 shows such a shift in the braking-force distribution through redistribution of the portions of the regenerative brake and of the conventional brake in a pictogram. The left-hand diagram illustrates that the regenerative braking torque at the rear axle RA exceeds the adhesion limit (lower arrow on the rear axle). This state brings about undesired instability of the vehicle.

The right-hand diagram illustrates the redistribution of the braking force. Since a longitudinal force which drops below the longitudinal force potential (or exceeds the adhesion limit) was generated in the left-hand diagram, the regenerative braking has to be reduced. In order to maintain the deceleration according to the driver's request, a conventional braking torque is applied in addition to the reduced regenerative braking torque. This conventional braking torque acts on all four wheels, i.e. on the front axle FA and the rear axle RA, since said braking torque is applied via a booster and no valves are activated. As a result, the total torque from the conventional braking and regenerative braking at the rear axle no longer exceeds the adhesion limit (lower arrow on the rear axle). In the example described, the total braking-force redistribution accordingly takes place in such a way that a regenerative braking torque which acts only on the rear axle is replaced by a conventional braking torque which acts on all four wheels. However, this method results in a situation in which an optimum level of efficiency is not achieved.

In order to increase the level of efficiency, it is possible, in a further exemplary embodiment, to carry out control in such a way that a conventional braking torque is not permitted at the rear axle, in order to avoid "wasting" any longitudinal force potential for the conventional brake at the rear axle, which longitudinal force potential would not be available for the regenerative brake. This can be implemented, for example, with the use of an electromechanical brake at the rear axle, with which electromechanical brake the conventional braking torque of the rear axle can be freely selected. With such a control strategy, when braking occurs, exclusively regenerative braking is carried out at first and conventional braking is not permitted until the maximum regeneration torque has been reached. The friction brakes are then first applied only on the front axle in order to reduce the back heaviness of the braking force boosting. If this measure leads to excessive front heaviness of the braking-force distribution, a portion of the necessary braking force is also applied to the rear axle by means of the electromechanical brakes and accordingly the regenerative portion is reduced, with the distribution of the braking force between the front and rear axles being set in such a way that the distribution then follows the optimum distribution as far as possible. In this context it is also possible, as long as the valves which distribute the brake pressure are not overloaded, also to control a conventional brake system in such a way that the valves which control the brake pressure acting on the rear axle are closed if a conventional braking force is to be generated only on the front axle.

In contrast to the example illustrated in FIG. 3, the regenerative braking torque portion can be increased if the slip evaluation reveals that there is still adhesion potential at the rear axle RA.

The decision as to whether the regenerative braking torque portion can be increased further or has to be reduced depends on whether the rear axle slip is below or above a predefined setpoint slip, with the magnitude of the change depending on the distance from the slip threshold. This is illustrated in FIG. 4, which shows control of the regenerative braking torque as a function of the rear axle slip.

Figure 4:
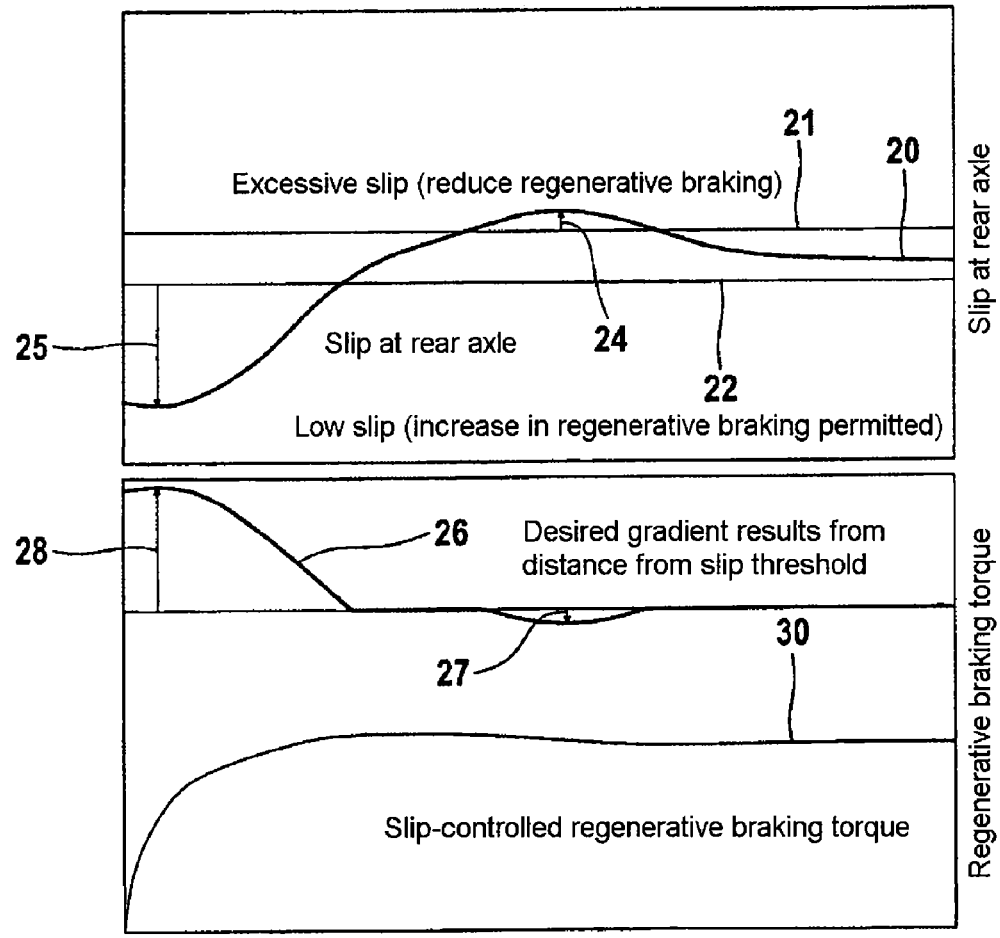
FIG. 4 shows the control of the regenerative braking torque at the rear axle as a function of the rear axle slip in diagrams.

In the upper diagram in FIG. 4, the slip 20 is plotted as a function of time. In a first section, the slip 20 at the rear axle is below a second slip threshold 22, with the distance between the slip 20 and the slip threshold 22 being indicated by the downward-pointing arrow 25. In the further course, the slip 20 changes in such a way that in a second section said slip is above a first slip threshold 21. The distance between the slip 20 and the first slip threshold 21 is marked with the arrow 24.

In the lower diagram in FIG. 4, the applied change in the regenerative braking torque 26 at the rear axle is plotted at the top by means of a timescale corresponding to the time period of the upper diagram. In the first section, in which the slip 20 is below the second slip threshold 22, the regenerative braking torque is increased greatly, with the gradient being large (cf. arrow 28) owing to the large distance of the slip from the second slip threshold 22. In the second section, in which the slip 20 is above the first slip threshold 21, the regenerative braking torque is reduced somewhat. Since the distance of the slip 20 from the first slip threshold 21 is small, the reduction in slip is also small (see arrow 27). The resulting regeneration torque at the rear axle is plotted against time as the curve 30 in the lower diagram in FIG. 4.

In the case of the calculation of the slip at the rear axle, the wheel which already has the greater slip should be considered, in accordance with the select-low principle. In addition, the wheel acceleration (filtered over time) can also be included in the calculation of the slip since, by means of the comparison of the wheel acceleration with the wheel deceleration, instability which is becoming apparent can be detected even earlier than if the system waits for the slip which is calculated only from the wheel speed to exceed the slip threshold.

Since the control of the regenerative braking torque portion is carried out in a sensitive fashion below the normal EBD system entry threshold, the frequency of EBD system interventions can be reduced virtually to the level of a conventionally braked vehicle. Before an EBD system intervention occurs, the regenerative braking torque portion is already reduced owing to the slip detection, so that it is already the case that only the conventional brake is active when the EBD system thresholds are reached.

Furthermore, the sensitive control limits the overbraking of the rear axle, which promotes driving stability and therefore reduces the frequency of ESP interventions.

The invention claimed is:

1. A method for operating a vehicle brake system for motor vehicles having at least one front axle (FA) and at least one rear axle (RA), wherein each axle (FA, RA) is assigned at least two vehicle wheels,
   wherein at least one wheel brake, which generates a braking torque, is provided on at least one of the front axle (FA) and the rear axle (RA),
   wherein the vehicle wheels which are assigned to an axle (FA, RA) are at least partially driven by an electric motor which can be operated as a generator during regeneration of braking energy, and, during regeneration, exerts a braking regeneration torque on a respective axle (FA, RA),
   wherein the regeneration torque acting on the at least one rear axle (RA) is limited in such a way that a slip present at at least one vehicle wheel of the at least one rear axle (RA) does not substantially exceed a first slip threshold which is respectively individually assigned to the at least one vehicle wheel of the at least one rear axle (RA), and
   wherein a change in the regeneration torque takes place when the slip drops below a second slip threshold of the vehicle wheel of the at least one rear axle (RA) which has the greater slip.

2. The method as claimed in claim 1, wherein the regeneration torque acting on the at least one rear axle (RA) is increased if the slip present at at least one vehicle wheel of the at least one rear axle (RA) drops below the second threshold which is individually assigned to the at least one vehicle wheel of the at least one rear axle (RA).

3. The method as claimed in claim 2, wherein a magnitude of a change in the regeneration torque depends on a distance of a determined slip from the first slip threshold or from the second slip threshold.

4. The method as claimed in claim 1, wherein the first slip threshold which is individually assigned to a vehicle wheel is variable.

5. The method as claimed in claim 1, wherein the limitation of the regeneration torque is carried out by accounting for the slip of the vehicle wheel of the at least one rear axle (RA) which has the greater slip.

6. The method as claimed in claim 1, wherein a distribution of a total braking force between a conventional brake and a regenerative brake is changed, thereby limiting the regeneration torque.

7. The method as claimed in claim 1, wherein vehicle acceleration and filtered vehicle wheel acceleration are also used to calculate the slip.

8. The method as claimed in claim 1, wherein the at least one wheel brake can be activated hydraulically.

9. A vehicle brake system for motor vehicles having at least one front axle (FA) and at least one rear axle (RA),
   wherein each axle is assigned at least two vehicle wheels,
   wherein at least one wheel brake, which generates a braking torque, is provided on the at least one front axle (FA) and/or the at least one rear axle (RA), and
   wherein at least one of an open-loop and closed-loop control unit is provided,
   wherein the vehicle wheels which are assigned to an axle are at least partially driven by an electric motor which can be operated as a generator during regeneration of braking energy and, in the process, exerts a braking regeneration torque on a respective axle,
   wherein the open-loop and/or closed-loop control unit limits a regeneration torque acting on a rear axle (RA) in such a way that a slip present at least one vehicle wheel of the rear axle (RA) does not significantly exceed a first slip threshold which is respectively individually assigned to the at least one vehicle wheel of the rear axle (RA), and
   wherein a change in the regeneration torque takes place when the slip drops below a second slip threshold of the vehicle wheel of the at least one rear axle (RA) which has the greater slip.

10. The vehicle brake system as claimed in claim 9, wherein the at least one wheel brake can be activated hydraulically.

* * * * *